United States Patent
Di Balsamo et al.

(10) Patent No.: US 10,528,612 B2
(45) Date of Patent: Jan. 7, 2020

(54) PROCESSING REQUEST DOCUMENTS

(71) Applicant: International Business Machines Corporation, Armonk, NY (US)

(72) Inventors: Arcangelo Di Balsamo, Rome (IT); Pietro Iannucci, Rome (IT); Kristof R. Kloeckner, Ridgefield, CT (US); Giovanni Lanfranchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/437,613

(22) Filed: Feb. 21, 2017

(65) Prior Publication Data
US 2018/0239816 A1    Aug. 23, 2018

(51) Int. Cl.
| | |
|---|---|
| G06F 16/00 | (2019.01) |
| G06F 16/36 | (2019.01) |
| G06F 16/93 | (2019.01) |
| G06F 16/33 | (2019.01) |
| G06F 16/35 | (2019.01) |
| G06F 16/332 | (2019.01) |

(52) U.S. Cl.
CPC .......... *G06F 16/367* (2019.01); *G06F 16/334* (2019.01); *G06F 16/3329* (2019.01); *G06F 16/355* (2019.01); *G06F 16/93* (2019.01)

(58) Field of Classification Search
CPC ...... G06F 16/367; G06F 16/93; G06F 16/334; G06F 16/355; G06F 17/30011; G06F 17/30654; G06F 17/30675; G06F 17/3071; G06F 17/30734; G06F 16/24578; G06F 16/3329
See application file for complete search history.

(56) References Cited

U.S. PATENT DOCUMENTS 7,072,857 B1    7/2006  Calonge
7,461,033 B1 *  12/2008  McConnell ........... G06F 16/345
                                                   706/12

(Continued)

OTHER PUBLICATIONS

Motahari-Nezhad et al., RFPCOG: Linguistic-Based Identification and Mapping of Service Requirements in Request for Proposals (RFPS) to IT Service Solutions, 2016 49th Hawaii International Conference on System Sciences, URL: http://ieeexplore.ieee.org/document/7427392/, pp. 1691-1700.

(Continued)

*Primary Examiner* — Noosha Arjomandi
(74) *Attorney, Agent, or Firm* — Schmeiser, Olsen & Watts. LLP; Mark Vallone

(57) ABSTRACT

A method and system for processing a request document including a request. The request document is processed using a question analysis function of a question answering system, thereby extracting elements of the request. The question answering system has multiple functions including the question analysis function. The extracted elements are categorized in accordance with an ontology model, thereby generating ontology components assigned to the extracted elements. A knowledge base includes data indicative of solutions for requests. The solutions for requests in the knowledge base are categorized in accordance with the ontology model. The knowledge base is searched using the generated ontology components, thereby identifying solutions for the request. The identified solutions are provided.

18 Claims, 4 Drawing Sheets

(56) References Cited

U.S. PATENT DOCUMENTS

| | | | |
|---|---|---|---|
| 7,925,974 B1* | 4/2011 | McConnell | G06F 16/345 |
| | | | 715/256 |
| 8,447,640 B2 | 5/2013 | Golan et al. | |
| 9,400,647 B2 | 7/2016 | Gonsalves | |
| 10,089,285 B2 | 10/2018 | Rameshkumar et al. | |
| 2001/0032172 A1 | 10/2001 | Moulinet et al. | |
| 2003/0177112 A1* | 9/2003 | Gardner | G06F 19/28 |
| 2005/0149538 A1* | 7/2005 | Singh | G06F 16/972 |
| 2008/0262945 A1 | 10/2008 | Clark | |
| 2009/0070295 A1* | 3/2009 | Otomori | G06F 17/2247 |
| 2009/0076928 A1 | 3/2009 | Hjertonsson et al. | |
| 2009/0094040 A1 | 4/2009 | Lewis | |
| 2010/0070448 A1* | 3/2010 | Omoigui | H01L 27/1463 |
| | | | 706/47 |
| 2010/0280916 A1 | 11/2010 | Foy et al. | |
| 2012/0041769 A1* | 2/2012 | Dalal | G06Q 10/101 |
| | | | 705/1.1 |
| 2013/0339101 A1* | 12/2013 | Riley | G06Q 10/0637 |
| | | | 705/7.36 |
| 2014/0164036 A1* | 6/2014 | Prieto | G06Q 10/063 |
| | | | 705/7.11 |
| 2016/0196313 A1* | 7/2016 | Allen | G06F 17/3053 |
| | | | 707/723 |
| 2016/0232221 A1* | 8/2016 | McCloskey | G06F 17/30598 |
| 2016/0239740 A1* | 8/2016 | Baughman | G06N 5/04 |
| 2016/0328469 A1* | 11/2016 | Zhu | G06F 17/2705 |
| 2017/0323241 A1* | 11/2017 | Gauba | G06Q 10/06315 |
| 2017/0323636 A1* | 11/2017 | Xiao | G10L 15/16 |

OTHER PUBLICATIONS

Answer Complex RFPS in a Flash With RFP Response Software, Retrieved from Internet Nov. 28, 2016, http://www.qvidian.com/proposal-software/rfp-responses, 3 pages.

* cited by examiner

PROCESSING REQUEST DOCUMENTS

TECHNICAL FIELD

The present invention relates to the field of digital computer systems, and more specifically, to a method for processing a request document including at least one request.

BACKGROUND

Analyzing and representing semantic knowledge of data are issues in database systems. Issues related to semantic knowledge have been increased by increasing amount of data in information sources, heterogeneity of representations of the data, etc. Request for Proposal (RFP) process is one of the processes that require a semantic knowledge of data. A RFP process includes writing RFP documents comprising requests for IT solutions and the search of the answers to the requests.

RFP documents are usually very dense of details and the complete reading and understanding of the RFP documents requires huge efforts. Current systems that deal with the RFP processes are overwhelmed by incoming requests, which creates delays in providing answers. Quite often responses are not accurate, resulting in huge damages for the provider inadequate solutions, extra-cost, bad sizing, problems during the execution, etc.).

SUMMARY

Embodiments of the present invention provide a method, and associated computer program product and computer system, for processing a request document comprising a request. One or more processors of the computer system process the request document using a question analysis function of a question answering system, thereby extracting elements of the request. The question answering system has multiple functions comprising the question analysis function. The one or more processors categorize the extracted elements in accordance with an ontology model, thereby generating ontology components assigned to the extracted elements, wherein a knowledge base comprises data indicative of solutions for requests, and wherein the solutions for requests in the knowledge base are categorized in accordance with the ontology model. The one or more processors search the knowledge base using the generated ontology components, thereby identifying solutions for the request. The one or more processors provide the identified solutions.

BRIEF DESCRIPTION OF THE DRAWINGS

The following embodiments of the invention are explained in greater detail, by way of example only, making reference to the drawings.

DETAILED DESCRIPTION

Figure 1:
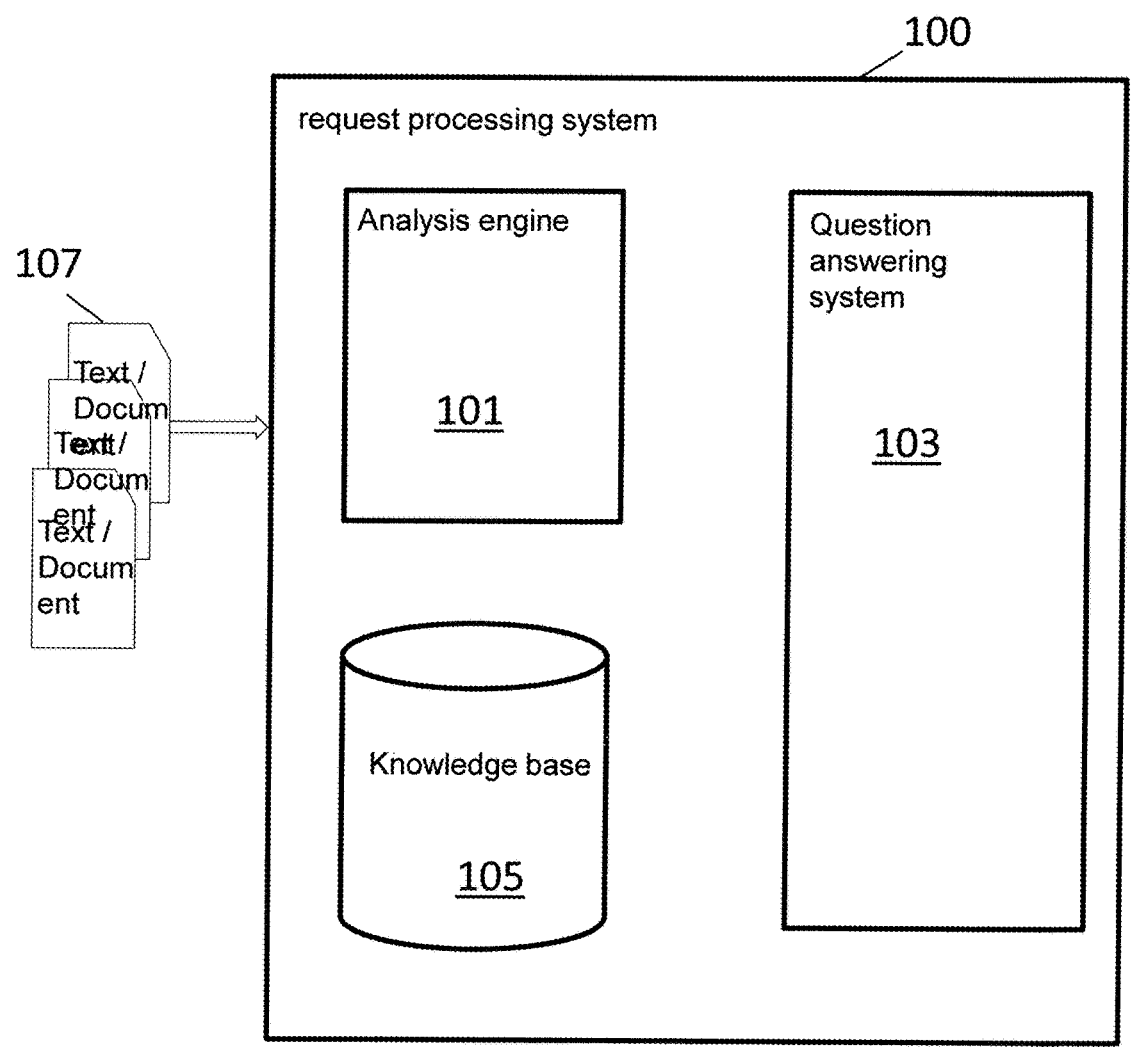
FIG. 1 is a block diagram of components of an example request processing system, in accordance with embodiments of the present invention.

The present method is based on an ontology to process request documents and categorize key concepts in order to extract requirements from the request documents and map the requirements to a set of pre-canned solution documents stored in the knowledge base; e.g., the solutions documents may be stored in an unstructured way. The present method may enable an autonomic MARE (monitor, analyze, plan, execute) loop to perform the entire request document process (e.g., RFP process). In one embodiment, the invention applies an autonomic MAPS loop to the entire RFP process and augments the MAPE loop by adding a learning phase, so that the invention outlines a method (with embodiments) which realizes a MAPEL (monitor, analyze, plan, execute and learn) to the process RFP process).

The present method may have the advantage of combining the cognitive capabilities of the question answering system to analyze a document and to find solutions with the usage of an ontology that allows categorization of both the request document and the solution building blocks in the knowledge base and standardization around a common vocabulary and key concepts.

The present method may overcome semantic confusion in terminologies caused by employing synonyms and homonyms, and providing users with the most relevant answers to the users requests in less time and/or resources.

According to one embodiment, the providing of the solutions further comprises: receiving user inputs indicating user tradeoff preferences; using a solution analysis function of the multiple functions of the question answering system for processing the user inputs, thereby generating an output from the provided solutions; providing the generated output.

The preceding one embodiment may provide a more precise solution with the use of a. two-stage solution, where in the first stage a semantic search to find answers based on the ontology information is used and in the second stage the results are refined using the question answering system; e.g., to perform a more precise ranking based on the information stored into a cognitive knowledge base of the question answering system.

According to one embodiment, the providing of the solutions comprises: using a solution outputting function (e.g., via an API) of the multiple functions of the question answering system for generating answer documents using predefined templates comprising the solutions. This embodiment may be seamlessly integrated with existing question answering systems. This may for example prevent having new output formats for the solutions which may not be usable or readable on the system. The creation of the answer document may be managed by extracting all the artifacts (documents, architectural diagrams, etc.) from the knowledge base that matches the request.

According to one embodiment, the request document comprises a request for proposal (RFP) or a request for service (RFS) document. Having a predefined structured document for providing the requests may facilitate the systematic (e.g., automatic) processing of the documents.

According to one embodiment, the categorizing of the extracted elements comprises for each element: determining a concept of the element, wherein the element is an instance or a class or a property of a class or a property of an instance of the determined concept. The method further comprises: determining relations between the elements, wherein the ontology components comprise the determined concepts, instances and/or classes and/or properties and relations, which may enable an accurate reformatting of the received request of the request document in accordance with the ontology model. For example, for extracted elements such as "car" and "black", ontology components may comprise "vehicle" as concept or model, "car" as class, and "color" as a car's property.

According to one embodiment, the searching of the knowledge base comprises: identifying ontology elements (such as domains, instances, classes and/or properties) in the knowledge base that correspond to the determined ontology components and matching or mapping properties or related elements of the identified ontology elements (such as concrete values of the identified elements) with the extracted elements. For example, if the request comprises only ontology components (e.g. "car", "diesel"), the mapping may not be needed and all identified ontology elements may be provided as solutions. However, if the request further comprises black color, the mapping may be performed to compare the properties of the identified ontology elements with the black color. The mapping may for example result in a set of solutions such as attribute values of classes and/or instances and/or properties that map to the extracted elements. For example, the ontology graph of the knowledge base that represents a domain similar to the domain of the request may be searched. A term can have several meanings in different domains. By first mapping the keyword to its semantic representation in the ontology model and then using the ontology's concepts, instances and relationships, a much more focused search approach can be taken, which may provide accurate solutions to the request of the request document. Following the above example of extracted elements such as "car" and "black", the identified ontology elements may comprise "vehicle" as model, "car" as class, and "color" as property of the car. The comparison may then be performed between different values of the "color" attribute of the car with the extracted element "black" and values of instances of a black car may be used as solutions such as black BMW, black Opel etc.

According to one embodiment, the providing of the solutions comprises creating an answer document by annotating the request into the request document with a corresponding highest ranked solution of the solutions. For example, the solutions may be ranked using the question answering system; e.g., based on the format, length, user ratings, etc. of the solutions.

According to one embodiment, the method further comprises: mapping the identified solutions to the ontology components by tagging the identified solutions in the knowledge base and further processing other request documents using the tags. The tags may provide the links between the solutions and the components of the ontology that have been determined. This one embodiment may speed up the search process in case of further use of the knowledge base. Tagging may for example be used to make evident some solutions that may be "hidden"; e.g., because the mapping may not find the solutions when using a different search criterion. For instance "Data in motion encryption" can be tagged with "secure network", "SSL", "VPN".

The preceding one embodiment may be part of a learning phase that augments or enhances the request document process (e.g., RFP process). The learning phase allows one or more of the following: augmenting knowledge base; augmenting the ontology model, and improving internal optimization techniques.

According to one embodiment, the method further comprises enhancing the content of the knowledge base and/or enhancing the ontology model using the solutions and/or request document. For example, given the request document and ingested knowledge, it can happen that a solution of a specific request matching all constraints (e.g. $c_1$, $c_2$, $c_3$) is not found, in which case the present method may provide a list of solutions and for each list of solutions, provide the matched constraints (e.g., Solution1 matches $c_1$ and $c_2$; Solution 2 matches $c_2$ and $c_3$). In this embodiment, by e.g. using a genetic algorithm, Solution1 and Solution2 may be combined to generate a new solution (Solution3), matching all of the 3 constraints $c_1$, $c_2$, $c_3$. The newly generated Solution3 can be added by to the knowledge bases to be later reused or even combined again with another solution; e.g., using the mentioned genetic algorithm. In such a way the present method may be able to autonomously build new solutions for unknown problems based on the past experience. In another example, during the learning phase the system might discover new objects or new relationships and propose to the user to extend the ontology model. For instance, assuming an ontology for automotive domain is used, if in the original ontology there isn't the object "Navigation System", the present system may provide the addition of this object ("Navigation System") along with a relationship with the "autovehicle" object, which is possible because the system finds many instances of "autovehicle" object in the same documents where also "Navigation System" is mentioned.

According to one embodiment, the search in the knowledge base is a semantic search. The semantic search may be concerned with the semantic correspondence between two given entities or terms. For example, a logical relation between the entities may be defined. The result of a matching can be a semantic relationship that is more general/specific or a mismatch.

According to one embodiment, the method is automatically performed, which may speed up the process of searching solutions for requests; in particular, when large systems are involved.

According to one embodiment, the method further comprises: using application program interfaces (APIs) of the question analysis function and the solution analysis functions for the processing of the document and the solutions. The preceding one embodiment may be seamlessly integrated with the existing question answer systems.

For example, the method may further comprise extracting relationships across different entities by introspecting diagrams and their labels.

The more information in the knowledge base,the better and the wider the solution found will be. A feeding-in to the ontology model can be achieved with text analysis algorithms to extract entities and relationships from a written document (Watson API as public API may be used for that purpose), and then the extracted entities and relationships can be fed into the ontology definition of the ontology model (automatically or after getting the approval from a human to accept the proposed extensions).

A request may be one or more words (e.g., in natural language) that form a search term or request for data, information or knowledge. The request may include various selection criteria and search terms. The request may be written using unrestricted syntax or restricted syntax. A request may be expressed in the form of a question having one or more keywords. In one example, the question may be defined as an interrogative sentence, or text string, that may be identified by, for example, the presence of a question mark at the end and/or the presence of an interrogative word such as "who", "what", "when", "where", and "why" at the beginning of the sentence.

A question answering system is a computing system that takes a user query formulated as a question and returns specific answers. Question answering systems typically provide one or more passages retrieved from documents that contain or support the answer. A question answering system may be a cognitive system such as IBM Watson system adapted for answering questions posed in natural language.

The term "user" as used herein refers to an entity; e.g., an individual, a computer, or an application executing on a computer or on a device.

FIG. 1 is a block diagram of components of an example request processing system 100, in accordance with embodiments of the present invention. The request processing system 100 comprises one or more functional components that work together to automatically determine answers to requests in specified text (e.g., from input documents). These components may be implemented in software or hardware or a combination of both.

The request processing system 100 comprises an analysis engine 101, a question answering system 103, and a knowledge data base 105. The request processing system 100 analyzes text segments from text or request documents 107 to automatically determine the solutions for the requests contained in the request documents 107. A request document 107 may for example comprise a UP and/or RFS document.

The analysis engine 101 receives text from the request documents 107, processes the received text and invokes functions of the question answering system 103 for providing solutions to the request indicated in the received text.

The question answering system 103 comprises multiple functions, wherein each function may be provided with a respective API. The multiple functions comprise at least one of a question analysis function, a solution analysis function, a solution outputting function, and a sematic search function.

The knowledge base 105 comprises data content indicative of solutions for requests. The solutions or the data content of the knowledge base are categorized or structured or represented in accordance with an ontology model (or ontology schema). For example, the ontology model may be used as a source of semantic information describing the underlying database. The ontology model may for example be a formal naming and definition of the types, properties, and interrelationships of the entities that exist for a particular domain of discourse. Ontologies describe individuals (instances), classes (concepts), attributes, and relations. The knowledge base may comprise data in a structure that represents the ontology model (e.g. describes abstract concepts (Class) and their relationships) and concrete individuals (Instance) and their relationships to other individuals and/or abstract concepts.

For example, the knowledge base 105 may comprise a graph database structured in accordance with the ontology model. For example, the structure of the knowledge base 105 can be described in terms of one or more graphs, e.g., for different ontologies. In one embodiment, at least one of the graphs may be organized in a hierarchical format. Each specific domain may be represented by a root ontology term of the respective graph. All terms in a domain can trace their parentage to the root term. The graphs of different domains may for example be independent or unrelated. In another example, the graphs of different domains may be related, In one example, the analysis engine 101 may be part of the question answering system 103. In another example, the analysis engine 101 may be a separate component of the question answering system 103. The question answering system 103 is controlled by the analysis engine 101 to find possible candidate entities in a vast array of knowledge information of the question answering system 103, to resolve which possible candidate entity is the most likely entity being referred to in the requests (in request documents 107), and to return solutions to the request.

The processing of the request in the request document 107 may comprise an analysis phase and a learning phase. The analysis phase may be performed in the following three steps. The first step comprises annotation and disambiguation of the request document 107 to capture key concepts, named entities and key relationships. For example, a Watson Cognitive technology may be used to perform the initial text parsing and word disambiguation. The second step comprises mapping the named entities in the first step with key elements available in the knowledge base 105. The third step comprises reasoning to infer a new set of relationships and composing knowledge base entities to produce the best fit. For example, after the matching is found, the system (e.g., question answering system 103) may further process the request document to refine the matching with finer solution artifacts based on a ranking mechanism and automatically annotate the request document 107 with the answer for each point (if matching found), or may provide a set of best matches to use as reference in case the perfect match is not yet available in the knowledge base 105. At the end of the analysis phase, one may point/build solutions into several domains: architecture, costs/finance, feasibility/SLA, as well as reference to other examples ranked by similarity.

Figure 2:
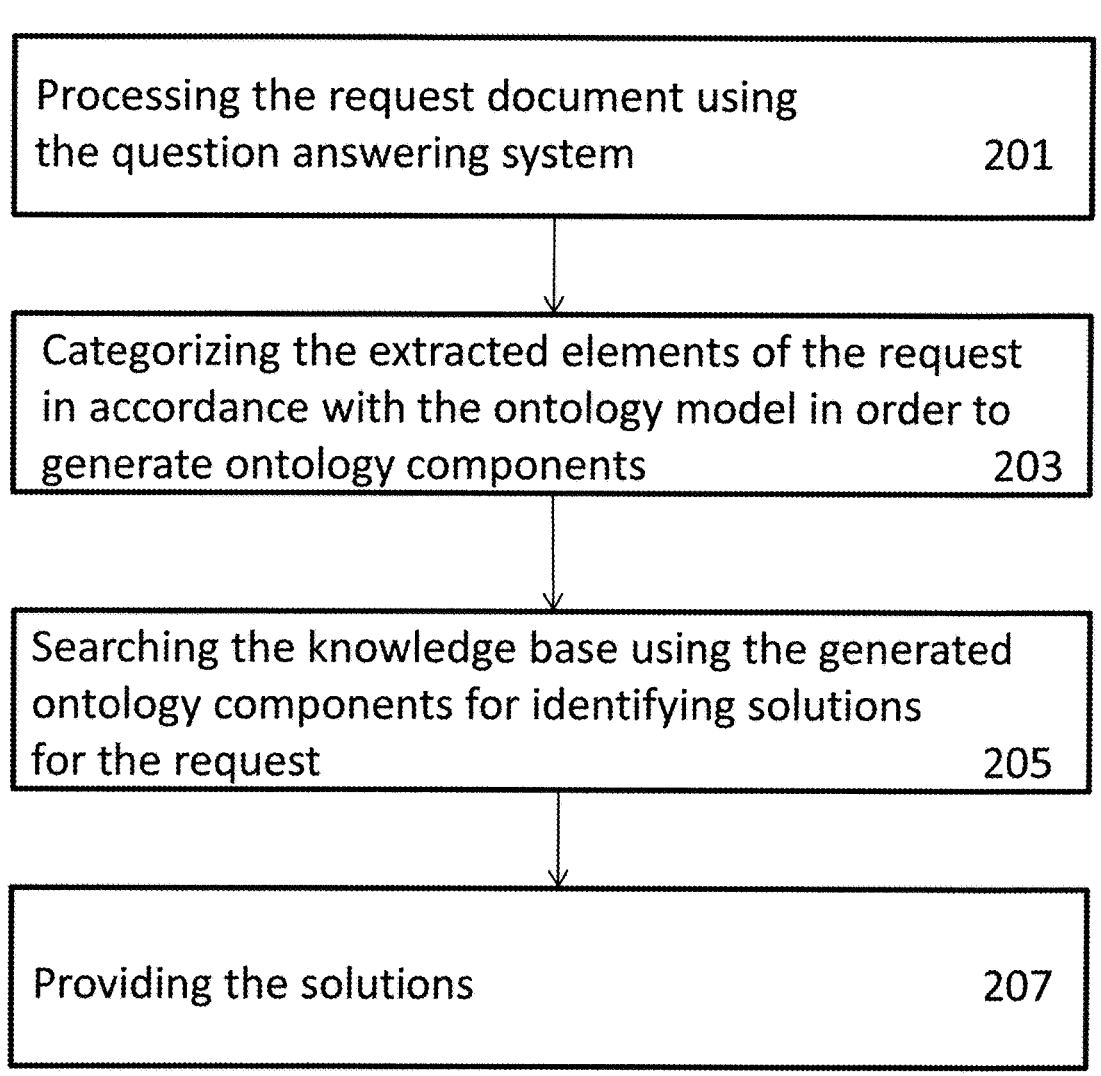
FIG. 2 is a flowchart of a method for processing a request document comprising at least one request, in accordance with embodiments of the present invention.

FIG. 2 is a flowchart of a method for processing a request document comprising at least one request, in accordance with embodiments of the present invention.

In step 201, the request document 107 may be processed using the question analysis function of the question answering system 103 such that elements or entities of the request may be extracted. For example, the analysis engine 101 may control the question answering system 103 to perform the processing of the request document 107, which may for example be done by calling an API of the question analysis function of the question answering system 103. The API may be called using as input the request document 107 or text of the request of the document 107.

The processing of the request may for example comprise a linguistics analysis for determining characteristics about the entities or elements mentioned (but not yet resolved) in the request. These characteristics may be matched to find possible candidate entities in an array of knowledge information of the question answering system 103 and possible candidate entity or element may be resolved or disambiguated. The resolved elements are the most likely entities or elements being referred to in the request of the request document 107.

In step 203, the extracted elements or entities of step 201 may be categorized or represented (e.g., by the analysis engine 101) in accordance with the ontology model in order to generate ontology components assigned to the extracted elements. A specific example method is described in FIG. 3. The ontology model may provide ontologies (e.g., a vehicle ontology) and structures of the ontologies in terms of classes, sub-classes, instances, properties, etc. The categorizing of the extracted elements comprises for each element: determining a concept or a domain of the element, wherein the element is an instance, subclass, class or property of the determined concept. Relations between the elements of the request may be determined. The ontology components comprise the determined concepts, instances (or subclasses, classes or properties) and relations. The relations between elements of the request may be categorized, since part of the elements may be attribute values of one or more other elements of the request.

Step 203 may enable extracting the relevant keywords by considering also the "context". For example, if the request of the request document 107 asks about a Black 4 wheel drive (WD) car fueled with diesel, the request can be mapped in an exemplary mapping to an automotive taxonomy, where car is defined as an entity that has some properties such as color, number or wheel drive, fuel, etc. That exemplary mapping enables a more accurate search for matching items in the items database. In a more complex case, the same requirement can be expressed in more complicated fans that might lead "linguistic-based" search engine to fail, such as for example: "I need a vehicle to carry max 4 people where streets are muddy and we have to use a cheap fuel". Using the ontology model in such example, step 203 may identify the word "vehicle" and recognizes the number "4" as number of max people that the vehicle can carry. Thus, all the "vehicles" that can carry more than 4 people are filtered out. Then vehicles that can move well in the mud are looked for, so only 4WD vehicles are selected. Then, vehicles fueled with diesel oil are selected, because vehicles fueled with diesel oil are the cheapest vehicles.

Step 203 may for example comprise comparing the extracted elements with a data structure indicating or representing the ontologies of the ontology model. For example, the data structure may indicate that vehicle is a domain and car is a class of the domain, color is a property of a car, etc. (e.g., the data structure describes concepts and relationships pertaining to the concepts). :For example, if the request is of "black car", step 203 may determine that the car is a class of a vehicle ontology, and black is a value of the property of color of the car of the vehicle ontology. The ontology components may comprise vehicle, car and color. Step 203 may automatically be performed. In another example, step 203 may comprise prompting a user for providing the ontology components of the request based on the ontology model, and receiving the ontology components.

In step 205, the knowledge base 105 may be searched using the generated ontology components and the extracted elements for identifying solutions for the request. The searching of the knowledge base may comprise: identifying instances in the knowledge base that correspond to the concepts and matching the identified instances with the extracted elements. Following the above example of the vehicle ontology, the vehicle ontology may be identified. Ontology elements or entries of the vehicle ontology that have a class car and the attribute color may be identified and the elements or entries of the ontology that are stored and that are black cars can be provided as solutions. Step 205 may be performed by the analysis engine 101 or the question answering system 103.

In step 207, the solutions are provided (e.g., by being stored on a hardware storage device, by being displayed on a display device of a computer or computer system, by being communicated in a message (e.g., by email) to one or more recipients of the message, by being provided to the user). In one example, upon providing the solutions, user inputs indicating user tradeoff preferences of the user may be received. Using the solution analysis function of the question answering system 103, the user inputs may be processed in order to generate an output from the provided solutions. For example, the solutions may be processed or filtered such that the solutions fulfil user criteria indicated in the user inputs. The generated output can then be provided; e.g., to the user. The generated output may comprise a subset of solutions of the solutions determined in step 207.

Figure 3:
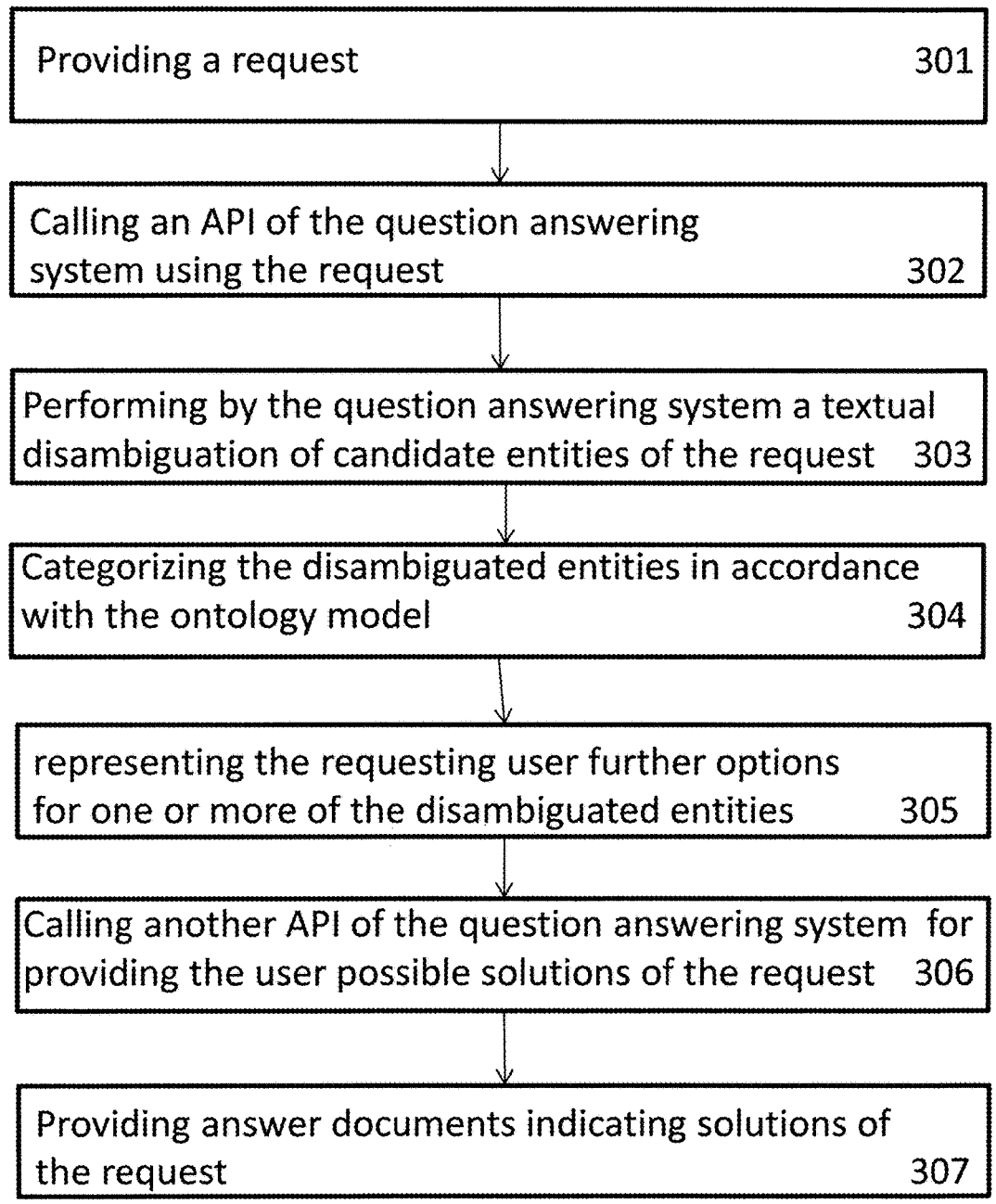
FIG. 3 is flowchart of an example method for processing a request, in accordance with embodiments of the present invention.

FIG. 3 is flowchart of an example method for processing a request, in accordance with embodiments of the present invention.

In step 301, a request for "a Black 4WD car fueled with diesel" is provided or received; e.g., as part of an RFP or RFS document 107. However, "normal" texts do not fit into a database management system that accesses the knowledge base 105. The knowledge base 105 is configured or represented or structured according to a predefined ontology model. Thus, the text of the request is processed in order to extract a format that can be managed by the analysis engine 101 for searching the knowledge base 105, and a question answering system 103 such IBM Watson may be used and enhanced with the present method.

The question answering system 103 is configured to, upon receiving a question, process the question and find a new format of the question that can be searched in databases of the question answering system 103. Those searched databases of the question answering system may have a format or structure which is different from the format or the structure of the knowledge base 105, which may be taken into account in the following steps.

In step 302 one or more APIs of the question answering system 103 are called. Assuming, for simplicity of the description, only one API is called in step 301. The call has parameters. The parameters of the call are the inputs of the API. The API supports as input one or more formats (e.g., a url, text messages, etc.). The request of step 301 may be given as parameters/input to the call of the API.

In step 303, the question answering system 1.03 may perform a textual disambiguation of candidate entities of the request of step 301, and then the text is transformed into a format in which the text can be analyzed by the question answering system. The disambiguation step may require a large number of knowledge bases that the API links to such as Websites, Freebase, DBPedia etc. The disambiguation result of step 303 is a car entity and corresponding sub-entities:

```
<type> car </type>
    <subType>4wd</subType>
    <subType>diesel car</subType>
    <subType> black </subType>
```

However, the preceding format has to be further worked out in order to be used with the knowledge base 105, so that, in step 304, the disambiguated entities of step 303 may "reformatted" or categorized in accordance with the ontology model. For example, the ontology model may further represent how the car components are represented and connected; e.g., via subclasses, or attributes etc. In this example, multiple attributes or related concepts of the disambiguated entity "car" may be evaluated. For example, it may be determined that the request relates to a domain "vehicle", which has as concept or class of a "car". The concept "car" in the ontology model of the "vehicle" domain has properties that can be described by attributes such as fuel, car class, color etc. In another example, the ontology model may indicate that the fuel is a subclass of the class car (e.g., diesel car is a subclass) instead of a property of a car or of an instance of car.

Using the disambiguated elements or entities and the ontology model may result in an ontology entry which contains information such as one or more of the following information data on the entity "car": name and synonyms of the entity; list of other entities that are related to the entity; specific domain of the entity, etc.

Table 1 depicts that the result of step 304 can for example be the following ontology entry:

TABLE 1

| entity | Fuel | class | color | Related entities | model | Gear | cylinder |
|---|---|---|---|---|---|---|---|
| car | Diesel | 4WD | black | | | | |

Since, the attributes such as "model", "gear" are not mentioned in the request of step 301, the attributes may for example be assigned multiple possible values such as Gear-5, Gear-6, etc. The search of the knowledge base may or may not include the attribute values that are not included in the request. In addition, the specific domain or concept (e.g., vehicle) to which belongs the entity of car may be determined, which may facilitate the solutions' search by searching in the corresponding knowledge base model of the knowledge base.

In step 305, (which is an optional step) the method may display or represent to the requesting user of step 301 further options for one or more of the disambiguated entities based on the ontology model. For example, the car entity options may presented such that the user has the possibility to further specify the request. For example, the multiple options of Gear can be displayed, etc. Then the user may select options such as a car that have 5 seats, cruise control, zero pollution under 100 Km/hour, etc.

After categorizing the disambiguated entities in accordance with the ontology model which may for example result in ontology entries (e.g., in Table 1), the present method may use the ontology entries as input for a call of another API of the question answering system 103. Thus, in step 306 (which is an optional step), the call of the other API may be performed such that optimal options or solutions of the request of step 301 can be provided to the user. The solutions may be obtained from the knowledge base. In addition, the trade-offs between the solutions can be highlighted such that the user can make decisions.

For example, the system 103 can produce multiple types of solutions that answer the request of step 301 and the user can perform a tradeoffs analysis (e.g., What is the solution with the best price/performance ratio? or what is the solution with the highest availability?, etc.).

In step 307 various types of answer documents (e.g., RFP/RFS answer, SOW generation, contract skeleton generation, etc.) to the request of step 301 may be provided using the knowledge base 105. The answer documents indicate or comprise solutions to the request. For example, the above ontology entry may be used by the a search engine of the question answering system 103 to search a vehicle ontology of the knowledge base (e.g. or in other terms to search the knowledge base domain that corresponds to vehicles) which has a similar structure because the knowledge base domain is also structured in accordance with the ontology model (e.g. for vehicles). For each type of solution, one or more documents can be provided in step 307. Step 307 can be based on the further inputs of step 305 and/or step 306.

In step 307, an ontology lookup on the above entity name (car) and attributes of the entity is performed; e.g., using an ontology search service of the search engine. The ontology search service may retrieve from the knowledge base 105 all matching ontology entries, wherein each ontology entry of the knowledge base 105 may be associated with enriched information such as links to documents or information etc. that can be used for providing or generating the answer documents.

For example, if the user in step 306 add inputs such as "What is the solution with the best price/performance ratio", the system step 307 would retrieve from the knowledge base 105 all matching ontology entries and compare the associated prices and performances of the matching ontology entries such that only entries that satisfy the user condition can be used for generating the answer documents.

Figure 4:
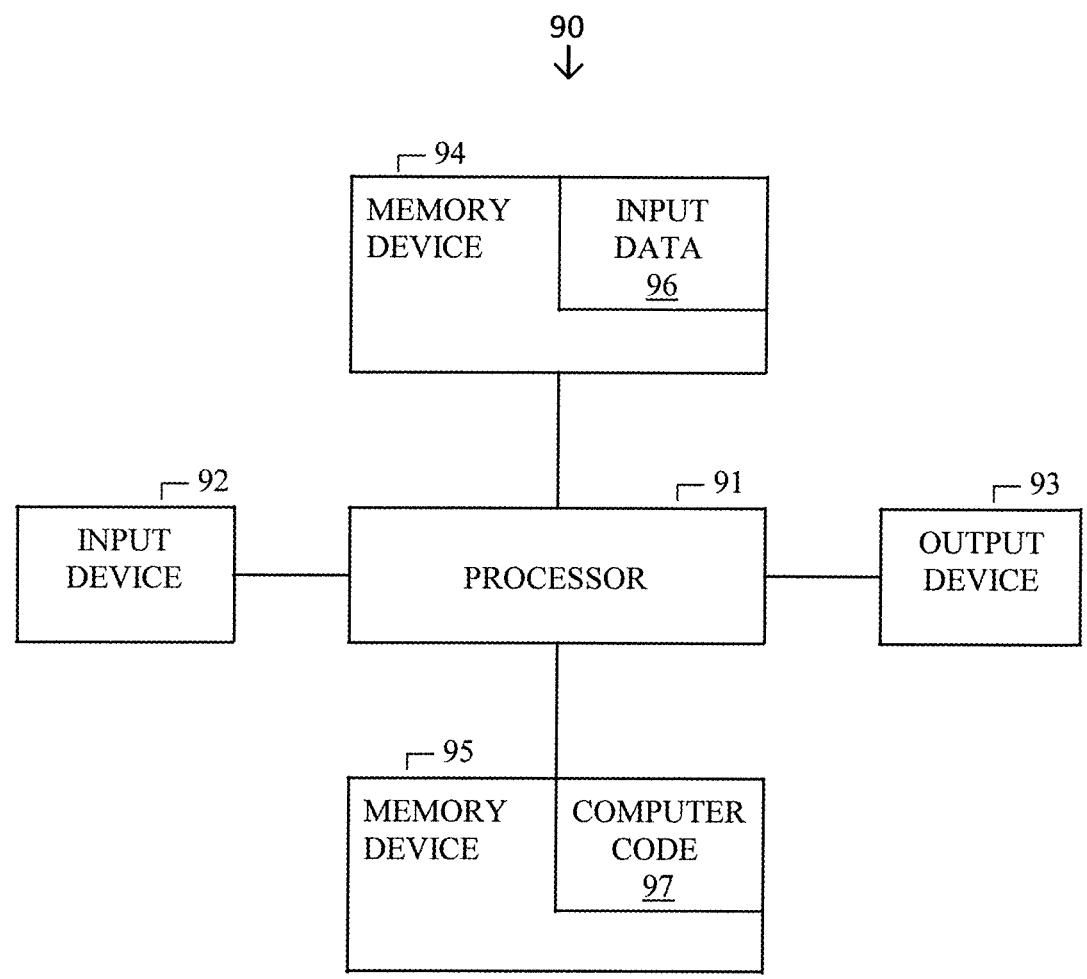
FIG. 4 illustrates a computer system used for implementing the methods of the present invention.

FIG. 4 illustrates a computer system 90 used for implementing the methods of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s) In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for processing a request document comprising a request, said method comprising:
   processing, by one or more processors of a computer system, the request document using a question analysis function of a question answering system, thereby extracting elements of the request, said question answering system having multiple functions comprising the question analysis function;
   categorizing, by the one or more processors, the extracted elements in accordance with an ontology model, thereby generating ontology components assigned to the extracted elements, wherein a knowledge base comprises data indicative of solutions for requests, wherein the solutions for requests in the knowledge base are categorized in accordance with the ontology model, and wherein said categorizing the extracted elements comprises for each element: determining a concept of the element wherein the element is an instance or a class of the determined concept and determining relations between the elements, wherein the ontology components comprise the determined concepts, instances and relations;
   searching, by the one or more processors, the knowledge base using the generated ontology components, thereby identifying solutions for the request; and
   providing, by the one or more processors, the identified solutions.

2. The method of claim 1, said providing the identified solutions comprising:
   receiving user inputs indicating user tradeoff preferences;
   using a solution analysis function of the multiple functions of the question answering system to process the user inputs, which generates an output from the provided solutions;
   providing the generated output.

3. The method of claim 1, said providing the identified solutions comprising:
   using a solution outputting function of the multiple functions of the question answering system for to generate answer documents using predefined templates comprising the solutions.

4. The method of claim 1, wherein the document comprises a request for proposal (RFP) or a request for service (RFS) document.

5. The method of claim 1, said searching the knowledge base comprising:
   identifying ontology elements in the knowledge base that correspond to the determined ontology components; and
   matching properties the identified ontology elements with the extracted elements.

6. The method of claim 1, said providing the identified solutions comprising:
   creating a request answer document by annotating the request into the request document with a corresponding highest ranked solution.

7. The method of claim 1, said method further comprising:
   mapping, by the one or more processors, the identified solutions to the ontology components by tagging the identified solutions in the knowledge base; and
   processing, by the one or more processors, other request documents using the tags.

8. The method of claim 1, said method further comprising:
   enhancing, by the one or more processors, the content of the knowledge base and/or enhancing the ontology model using the solutions and/or request document.

9. The method of claim 1, wherein said searching the knowledge base comprises semantically searching the knowledge base.

10. The method of claim 1, said method further comprising:
    using, by the one or more processors, application program interfaces (APIs) of the question analysis function and solution analysis functions for processing the document and the solutions.

11. A computer program product, comprising one or more computer readable hardware storage devices having computer readable program code stored therein, said program code containing instructions executable by one or more processors of a computer system to implement a method for processing a request document comprising a request, said method comprising:
    processing, by the one or more processors, the request document using a question analysis function of a question answering system, thereby extracting elements of the request, said question answering system having multiple functions comprising the question analysis function;
    categorizing, by the one or more processors, the extracted elements in accordance with an ontology model, thereby generating ontology components assigned to the extracted elements, wherein a knowledge base comprises data indicative of solutions for requests, wherein the solutions for requests in the knowledge base are categorized in accordance with the ontology model, and wherein said categorizing the extracted elements comprises for each element: determining a concept of the element wherein the element is an instance or a class of the determined concept and determining relations between the elements, wherein the ontology components comprise the determined concepts, instances and relations;

searching, by the one or more processors, the knowledge base using the generated ontology components, thereby identifying solutions for the request; and providing, by the one or more processors, the identified solutions.

12. The computer program product of claim 11, said providing the solutions comprising:

receiving user inputs indicating user tradeoff preferences;

using a solution analysis function of the multiple functions of the question answering system to process the user inputs, which generates an output from the provided solutions;

providing the generated output.

13. The computer program product of claim 11, said providing the solutions comprising:

using a solution outputting function of the multiple functions of the question answering system for to generate answer documents using predefined templates comprising the solutions.

14. The computer program product of claim 11, wherein the document comprises a request for proposal (RFP) or a request for service (RFS) document.

15. A computer system, comprising one or more processors, one or more memories, and one or more computer readable hardware storage devices, said one or more hardware storage device containing program code executable by the one or more processors via the one or more memories to implement a method for processing a request document comprising a request, said method comprising:

processing, by the one or more processors, the request document using a question analysis function of a question answering system, thereby extracting elements of the request, said question answering system having multiple functions comprising the question analysis function;

categorizing, by the one or more processors, the extracted elements in accordance with an ontology model, thereby generating ontology components assigned to the extracted elements, wherein a knowledge base comprises data indicative of solutions for requests, wherein the solutions for requests in the knowledge base are categorized in accordance with the ontology model, and wherein said categorizing the extracted elements comprises for each element: determining a concept of the element wherein the element is an instance or a class of the determined concept and determining relations between the elements, wherein the ontology components comprise the determined concepts, instances and relations;

searching, by the one or more processors, the knowledge base using the generated ontology components, thereby identifying solutions for the request; and providing, by the one or more processors, the identified solutions.

16. The computer system of claim 15, said providing the solutions comprising:

receiving user inputs indicating user tradeoff preferences;

using a solution analysis function of the multiple functions of the question answering system to process the user inputs, which generates an output from the provided solutions;

providing the generated output.

17. The computer system of claim 15, said providing the solutions comprising:

using a solution outputting function of the multiple functions of the question answering system for to generate answer documents using predefined templates comprising the solutions.

18. The computer system of claim 15, wherein the document comprises a request for proposal (RFP) or a request for service (RFS) document.

* * * * *